(12) United States Patent
Liu

(10) Patent No.: US 7,098,667 B2
(45) Date of Patent: Aug. 29, 2006

(54) COLD CATHODE ION GAUGE

(75) Inventor: Kun Liu, Peabody, MA (US)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 10/997,410

(22) Filed: Nov. 23, 2004

(65) Prior Publication Data

US 2005/0140375 A1  Jun. 30, 2005

Related U.S. Application Data

(60) Provisional application No. 60/536,060, filed on Jan. 13, 2004, provisional application No. 60/533,680, filed on Dec. 31, 2003.

(51) Int. Cl.
*G01L 21/30* (2006.01)

(52) U.S. Cl. .................... 324/460; 324/464

(58) Field of Classification Search ............... 250/281; 324/460, 464; 315/169.1; 313/7
See application file for complete search history.

(56) References Cited

U.S. PATENT DOCUMENTS

| | | | | |
|---|---|---|---|---|
| 3,582,710 | A * | 6/1971 | Favreau | 315/108 |
| 4,440,995 | A * | 4/1984 | Lange et al. | 218/122 |
| 4,862,032 | A * | 8/1989 | Kaufman et al. | 313/359.1 |
| 4,967,157 | A * | 10/1990 | Peacock | 324/460 |
| 5,278,510 | A * | 1/1994 | Baptist et al. | 324/460 |
| 6,566,884 | B1 * | 5/2003 | Rutherford et al. | 324/460 |
| 6,590,375 | B1 * | 7/2003 | Kinne | 324/71.1 |
| 6,960,283 | B1 * | 11/2005 | Lee et al. | 204/298.14 |
| 2004/0095705 | A1 * | 5/2004 | Mills et al. | 361/230 |
| 2004/0189314 | A1 * | 9/2004 | Le Foll et al. | 324/464 |
| 2006/0012373 | A1 * | 1/2006 | Edelmann et al. | 324/460 |

FOREIGN PATENT DOCUMENTS

| | | |
|---|---|---|
| GB | 555134 | 2/1946 |
| WO | WO 2005001020 A2 * | 1/2005 |

* cited by examiner

*Primary Examiner*—Walter Benson
(74) *Attorney, Agent, or Firm*—Hilgers, Bell & Richards; Michael O. Scheinberg; David Griner

(57) ABSTRACT

A cold cathode ion gauge is provided that is suitable for use in a high vacuum and in the presence of contaminating gases. By decreasing the discharge current and, more precisely, decreasing the charge current density received by the gauge electrodes, and using certain type of materials for the gauge electrodes, the mechanism by which insulating films are deposited on surface of the electrodes is attenuated and the life of the gauge is significantly prolonged. The gauge discharge current can be decreased by providing a large resistor in series with the anode, while the charge current density can be decreased by using an electrode with larger surface area, which can be achieved by fabricating grooves or fans on electrodes and by using low electron backscattering and low secondary emission materials, like carbon.

Another concept of constant current mode is also proposed in this invention for extending the lifetime of CCIGs that are used for vacuum containing unfriendly gases.

42 Claims, 9 Drawing Sheets

COLD CATHODE ION GAUGE

This application claims priority from U.S. Provisional Patent Application No. 60/533,680, filed on Dec. 31, 2003 and from 60/536,060, filed Jan. 13, 2004 both of which are hereby incorporated by reference.

TECHNICAL FIELD OF THE INVENTION

The present invention relates to gauges for measuring vacuum, particularly gauges for use in high vacuum systems.

BACKGROUND OF THE INVENTION

Many industrial applications require processing in a vacuum, from a ultra high vacuum ("UHV"), that is, a very low gas pressure of less than about $10^{-8}$ Torr, to a rough vacuum, in which the pressure can be almost as high as atmospheric pressure. The terms "vacuum" and "pressure" are used in opposite senses, in that a "high vacuum" means a "low pressure" and vice versa.

Different types of vacuum gauges are used to measure vacuum in different pressure ranges. For example, a Pirani gauge is suitable for use in a vacuum from $10^{-5}$ Torr ($1.3 \times 10^{-3}$ Pa) to atmospheric pressure; a hot cathode ion gauge (HCIG), is suitable for vacuums from about $10^{-2}$ ($1.3$ Pa) to about $10^{-10}$ Torr ($1.3 \times 10^{-8}$ Pa); and the cold cathode ion gauge (CCIG), is used for vacuum from about $10^{-2}$ Torr ($1.3$ Pa) to about $10^{-13}$ Torr ($1.3 \times 10^{-11}$ Pa). Each type of gauge has advantages and disadvantages.

The Pirani gauge determines pressure by measuring thermal conductivity, which varies with the gas pressure in the vacuum chamber. A Pirani gauge can effectively measure pressure from a low vacuum up to atmosphere, but loses sensitivity in a high vacuum. In HCIGs, thermionically emitted electrons are accelerated and ionize gas molecules, which support a discharge current that varies with the gas pressure. The discharge current is correlated to pressure to measure the vacuum. An HCIG can measure a wide range of vacuums, but the hot filament produces heat, which can cause gases in the vacuum chamber to chemically react to produce compounds that promote contamination and corrosion. The heated filament also "outgases," that is, drives off gases from the filament into the vacuum chamber. In contrast, a CCIG uses a high voltage static electric field and an orthogonal magnetic field to enhance the gas molecule ionization process. The CCIG reduces or eliminates heat-related failures.

FIGS. 1A and 1B show schematically a typical prior art standard CCIG 100, in which a high voltage source 102 supplies a constant high voltage, typically between about 2 kV and about 6 kV, between an anode 104 and a cathode 106 to produce an electric field 108 in the space between the anode and cathode. A magnetic field 110 orthogonal to the electric field is concurrently applied. The magnetic field, which produces a force on charged particles perpendicular to their velocities, causes the charged particles to traverse a meandering path, which increases the probability of collisions with gases in the gauge. Starting from the first stray charged particle, a stable discharge current builds up through various collisions between charged particles and stray gases.

FIG. 1B shows a typical collision sequence in which an electron 120 collides with a gas molecule to generate an ion 122 and additional electrons 124. Ion 122 also generates an electron 126 when it impacts the cathode 106. The movement of charged particles to the anode and cathode constitutes a current, referred to as an "ionization current" or a "discharge current," which is measured by a current meter 112. The discharge current depends sensitively, typically exponentially, on the level of vacuum. At higher vacuums, there are less gas molecules to collide with and generate charges. As the vacuum changes from low to high, the discharge current decreases. The discharge or ionization current of the CCIG is detected, amplified, and used for calibrating the pressure in the vacuum. The discharge current also depends on the type of gases in the vacuum chamber.

In practice, CCIGs are used mainly for measuring vacuums higher than about $10^{-5}$ Torr. In a lower vacuum range from about $10^{-4}$ Torr to about $10^{-2}$ Torr, the greater concentration of gas molecules creates a very large ionization current, which causes excessive heat and sputtering of materials from the electrodes. Attempts have been made to solve the heating and sputtering problem to extend the CCIG measuring range to lower vacuum between about $10^{-4}$ Torr and about $10^{-2}$ Torr. For example, Klemperer describes in British Patent No. 555 134 for "Improvements in or relating to apparatus for measuring low gas pressure" a CCIG operating in two modes: a constant voltage operation in the high vacuum range at which discharge current is limited by the low gas pressure, and a constant current operation mode for operation in a low vacuum range to reduce the discharge current. U.S. Pat. No. 4,967,157 for a "Method And Circuit For Extending The Range Of A Cold Cathode Discharge Vacuum Gauge" to Peacock describes adding a large series resistor to the anode circuit to reduce the excessive current in low vacuum applications.

While known solutions exist for using CCIGs at low vacuum, in most applications CCIGs operate reliably in a high vacuum with a long lifetime. In some high vacuum applications, however, CCIGs tend to fail after a relatively short period of use. For example, charged particle beam systems, such focused ion beam systems and electron beam systems, used for applications such as circuit edit and photolithography mask repair, often employ metal organic gases and other unfriendly gases for milling and deposition. Although the gas pressure in such application is sufficiently low to avoid excessive heat and sputtering, CCIGs in such applications can still suffer a short average lifetime of about two weeks. Typical failures, which can occur after between two weeks and a few months of operation, are manifested as questionable vacuum readings, unstable vacuum readings, and malfunctions of the gauge.

Prior art efforts to increase the useful life of CCIGs were directed to solving the heating and sputtering problem of CCIGs when used in low vacuums, from about $10^{-4}$ Torr to about $10^{-2}$ Torr. At higher vacuums, the discharge current is relatively low, so heating and sputtering problems do not occur. The problem of short CCIG lifetimes when operating at high vacuum, such as pressures less than about $10^{-4}$ Torr, less than about $10^{-5}$ Torr or less than about $10^{-6}$ Torr, has not been solved because the mechanism for failure at the low pressures was unknown.

SUMMARY OF THE INVENTION

An object of the invention is to provide a CCIG with extended life.

The present invention provides a long lasting CCIG that is particularly useful in a high vacuum system environment that includes "unfriendly" gases, that is, gases that tend to degrade performance of the gauge.

CCIGs have relatively long life spans when used at high vacuum in which the residual gases in the vacuum chamber include gases, such as nitrogen and air, which are relatively unreactive. Applicant has found that the relatively short life spans of CCIGs at high vacuum can be caused by charged particle induced reactions, such as deposition onto the gauge electrodes from certain residual "unfriendly" gases in the vacuum chamber.

Various aspects of the invention mitigate the detrimental effects of the unfriendly gases in various ways, typically by reducing the current density within the gauge, such as by reducing the total current and/or by increasing the area of one or both electrodes. Reducing the current density reduces the deposition rate (thickness per area per unit time), thereby increasing the life of the gauge. Other embodiments construct the electrode from materials that reduce the detrimental effects of the gases. Such preferred materials can, for example, reduce the ionization current by reducing electron backscattering and secondary electron emission. Other preferred materials can remove contaminants or oxygen by "gettering" or by forming benign, volatile by-products. Other materials can be readily cleaned of any deposition and quickly returned to service.

Applicant's recognition of the cause of the problem led to several innovative solutions, some or all of which can be incorporated into various embodiments, depending on the application. Not all embodiments will incorporate every solution.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and the advantages thereof, reference is now made to the following descriptions taken in conjunction with the accompanying drawings, in which.

DETAILED DESCRIPTION OF THE PREFERRED EMBODIMENTS

Figure 1B:
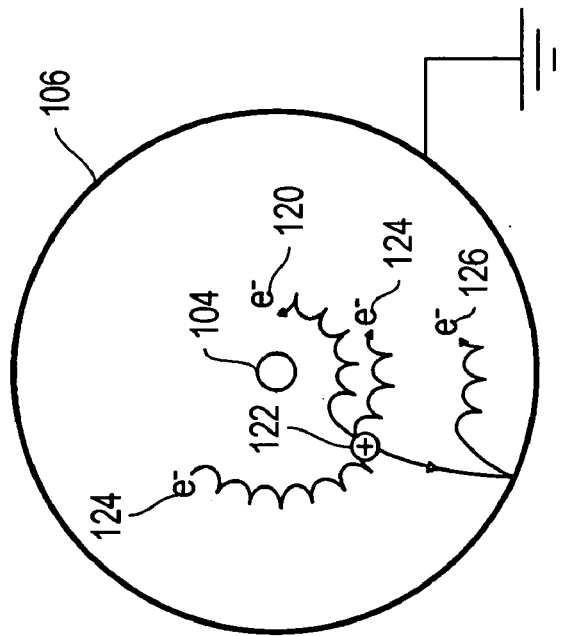
FIGS. 1A and 1B show schematically a prior art CCIG.
Figure 1A:
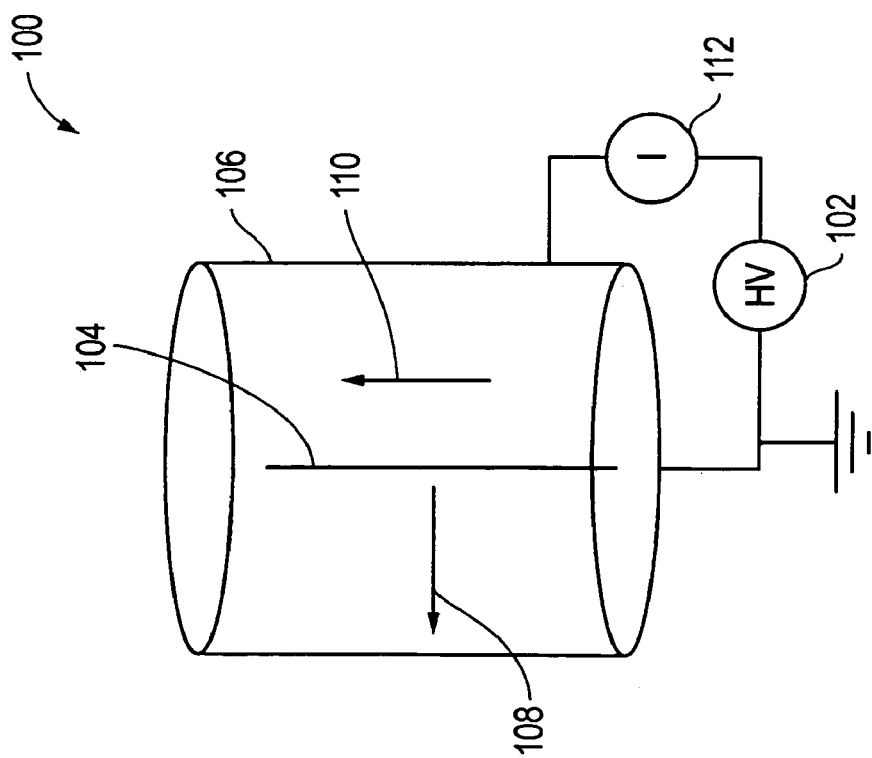

The invention solves the problem of reduced CCIG useful life at low pressures. The present invention is particularly suited for measuring high vacuum containing unfriendly gases that could cause deposition, corrosion, or other problems. Such gases are typically introduced into the system for use with charge-particle beams, for example, in a circuit edit or mask repair process, for charged particle beam induced deposition or etching. The invention is particularly suitable for use in a vacuum system having a pressure less than about $10^{-5}$ Torr, particularly in the high vacuum range of $10^{-6}$ to $10^{-5}$ Torr. While the invention solves problems related to vacuum systems using unfriendly gases at high vacuums, the invention is not limited to those applications and aspects of the invention can be beneficially applied to vacuum gauges in other vacuum systems.

Applicant has discovered that the degradation CCIGs in an environment of unfriendly gases can be caused by the charged-particle-induced deposition of an insulating material on portions of the electrodes. Applicant reduces the deposition using various techniques, including reducing the ionization current density, for example, by reducing the total ionization current or by increasing the area of the anode and/or cathode. The area of the electrodes can be increased, for example, by using a star-shaped anode or by putting grooves or ridges in the anode or cathode, or by attaching fan-like vanes to the anode or cathode. The ionization current can be reduced, for example, by using a resistor in series in the ion current circuit or by using a constant current supply. Preferred current densities at the anode at a pressure of $1\times10^{-5}$ torr are less than 20 $\mu A/cm^2$, less than 10 $\mu A/cm^2$, less than 5 $\mu A/cm^2$, less that 2 $\mu A/cm^2$, less than 1 $\mu A/cm^2$, less than 0.5 $\mu A/cm^2$, and less than 0.1 $\mu A/cm^2$ In some embodiments, the useful life of the CCIG is also increased by the fabrication of parts of the CCIG using materials selected in recognition of the mechanism that reduces CCIG life. For example, the anode may be made of a material that has lower yield of backscatters electrons and secondary electrons. Because back scattered and secondary electrons also contribute insulator deposition on electrode surface, materials that reduce back scattered or secondary electrons can reduce the total current density received by the electrodes. A preferred material may also assists in reducing contamination by removing contaminants or reactants that could form an insulating layer from the gauge. For example, use of a gettering material, such as titanium, on the cathode can also reduce the detrimental effects of unfriendly gases by removing gases from the gauge. Similar materials like tantalum, barium, zirconium and thorium are known and used in some getter-based types of ultra high vacuum pumps. Use of a material, such as carbon, that combines with oxygen to form volatile products can remove oxygen from the gauge, thereby reducing deposition of insulating, oxidized materials.

Some embodiments of the inventions can extend the lifetime of a CCIG operating with "unfriendly gases" from two weeks to a few months or even longer depending on the gauge design and the type and the pressure of gases in the vacuum chamber.

CCIG failures in circuit edit machines are typically recognized as unlikely high vacuum readings, unstable vacuum readings or total cessation of operation. In order to understand the root causes of the failures, the applicant examined many gauges using analytical tools, such as a scanning electron microscope and energy dispersive x-ray spectroscopy. Observations of failed gauges are presented in FIGS. 2A through FIG. 3D.

Figure 2B:
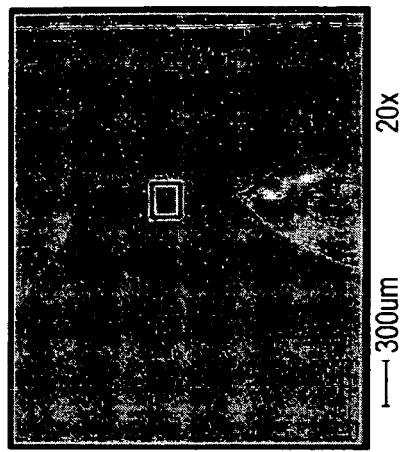
FIGS. 2A and 2B are scanning electron micrographs (SEM) of surfaces of an anode and a cathode, respectively, of a prior art CCIG that had been used in a system containing silicon oxide precursor gases.
Figure 2A:
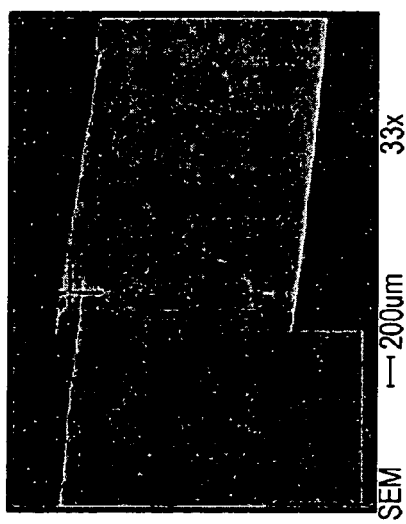
Figure 2D:
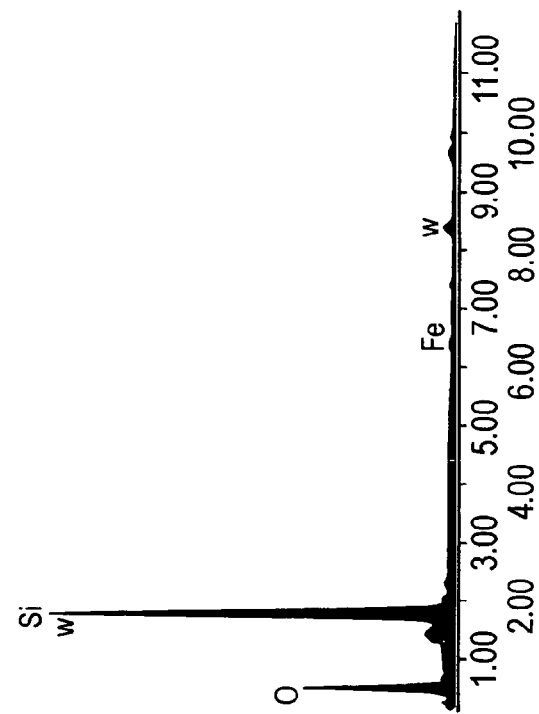
FIGS. 2C and 2D show elemental analyses of the surfaces shown in FIGS. 2A and 2B, respectively.
Figure 2C:
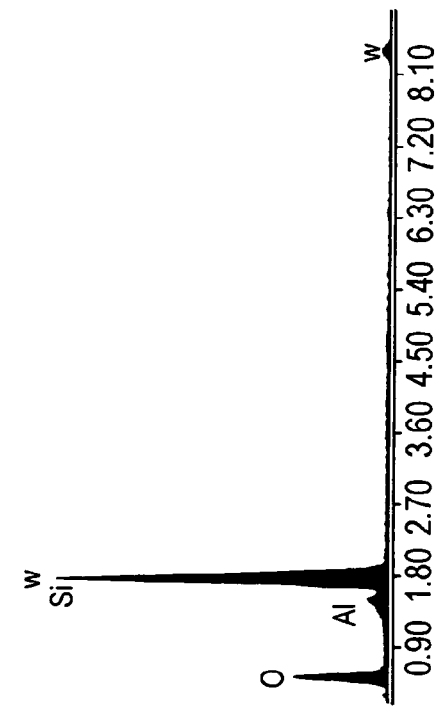

FIGS. 2A and 2B are scanning electron micrographs of an anode and a cathode, respectively, that were used in a CCIG in an environment that included siloxane and oxygen precursor gases for silicon oxide deposition. FIGS. 2A and 2B show the anode and cathode coated with a thick film. FIGS. 2C and 2D are energy dispersive x-ray spectrometry (EDX) graphs showing the elemental composition of the thick films of FIGS. 2A and 2B, respectively. Tables 1 and 2 below tabulate the elemental composition from the EDX graphs of FIGS. 2C and 2D, respectively. FIGS. 2C and 2D and Tables 1 and 2 shows that the film coating the anode and cathode are composed primarily of silicon dioxide.

TABLE 1

| Element | Weight Percent | Atomic Percent |
| --- | --- | --- |
| O | 32.62 | 56.78 |
| Al | 1.99 | 2.05 |
| Si | 37.21 | 36.90 |
| W | 28.18 | 4.27 |

TABLE 2

| Element | Weight Percent | Atomic Percent |
| --- | --- | --- |
| O | 20.66 | 51.77 |
| Si | 24.49 | 34.96 |
| Fe | 2.61 | 1.88 |
| W | 52.24 | 11.39 |

Figure 3A:
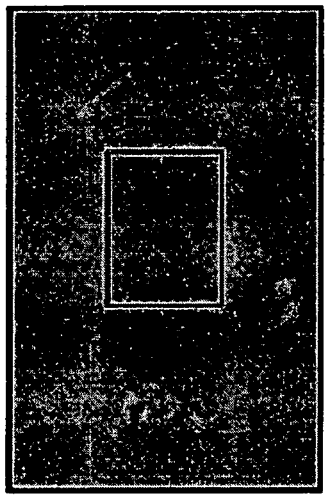
FIGS. 3A and 3B are scanning electron micrographs (SEM) of surfaces of an anode and a cathode, respectively, of a prior art CCIG that had been used in a system containing a tungsten precursor gas.
Figure 3B:
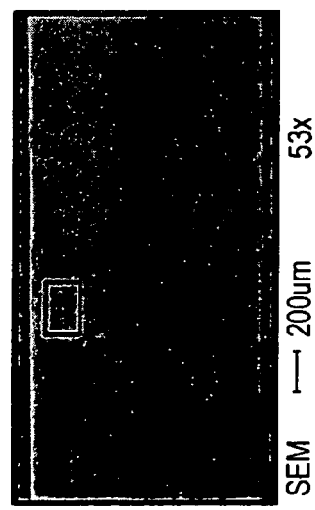
Figure 3C:
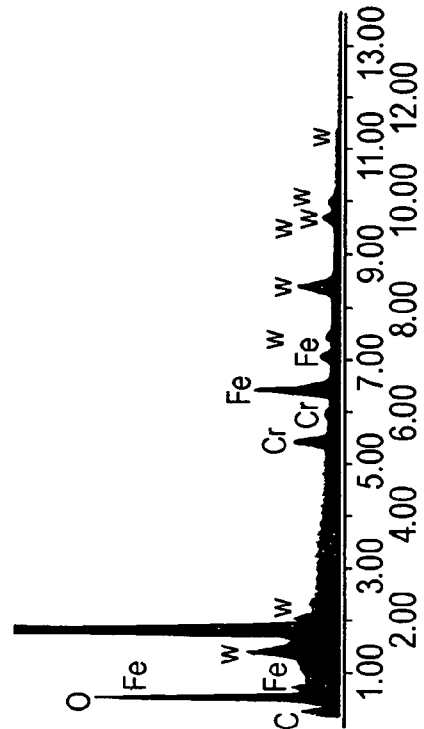
FIGS. 3C and 3D show elemental analyses of the surfaces shown in FIGS. 3A and 3B, respectively.
Figure 3D:
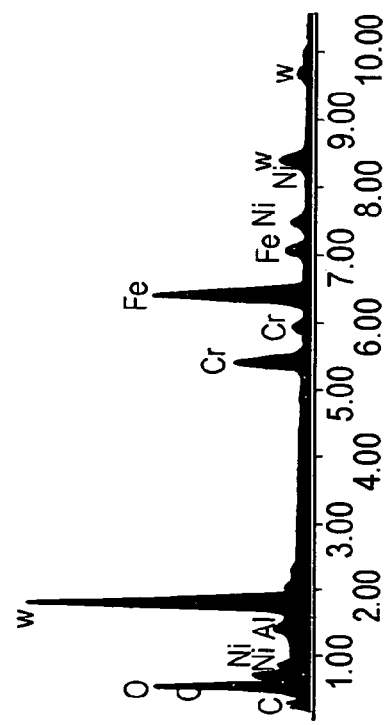

FIGS. 3A through 3D are analogous to FIGS. 2A through 2D, but the gauge was operated in an environment in which a tungsten precursor gas, tungsten hexacarbonyl, was used. FIGS. 3A and 3B show that the anode and cathode are coated with a thick film. FIGS. 3C and 3D are EDX graphs showing the elemental composition of the thick films of FIGS. 3A and 3B, respectively. Tables 3 and 4 below tabulate the elemental composition from the EDX graphs of FIGS. 3C and 3D, respectively. FIGS. 3C and 3D and Tables 3 and 4 shows that the film coating the anode and cathode includes oxides of tungsten ($WO_x$). The iron, chromium and nickel detected are from the stainless steel anode or cathode.

TABLE 3

| Element | Weight Percent | Atomic Percent |
| --- | --- | --- |
| C | 5.79 | 17.38 |
| O | 16.84 | 37.91 |
| F | 6.81 | 12.92 |
| Cr | 8.75 | 6.06 |
| Fe | 26.91 | 17.36 |
| Ni | 3.66 | 2.25 |
| W | 31.23 | 6.12 |

TABLE 4

| Element | Weight Percent | Atomic Percent |
| --- | --- | --- |
| C | 2.98 | 14.59 |
| O | 12.50 | 46.00 |
| Cr | 4.04 | 4.57 |
| Fe | 12.32 | 12.99 |
| W | 68.17 | 21.84 |

The insulating coatings act as a very large resistance in series with the CCIG ionization circuit. The increased resistance attenuates the discharge current to a very low value, leading to a false high vacuum reading. As the deposited film is not uniform, which causes a non-uniform lower electric field between the anode and cathode; an unstable vacuum reading is typically observed. When the deposited film becomes too thick, the high voltage is insufficient to maintain the gas ionization process, and the gauge ceases to function completely.

To determine the source of the insulating coating, applicant investigated two processes that might account for the coating of insulating films: high electric field-induced oxidation and charge particle-induced deposition. For electric field-induced oxidation, a high field up to $10^7$ V/cm is necessary [see P. Avouris, T. Hertel, and R. Martel, "Atomic Force Microscopy Tip-induced Local Oxidation of Silicon: Kinetics, Mechanism, and Nanofabrication," *Appl. Phys. Lett* 71(2), 285 (1997). Such fields are not typically present in the CCIG in charged particle beam systems used for circuit edit in which a constant high voltage of 3 kV is applied between anode and cathode separated by about 10 mm.

Figure 4:
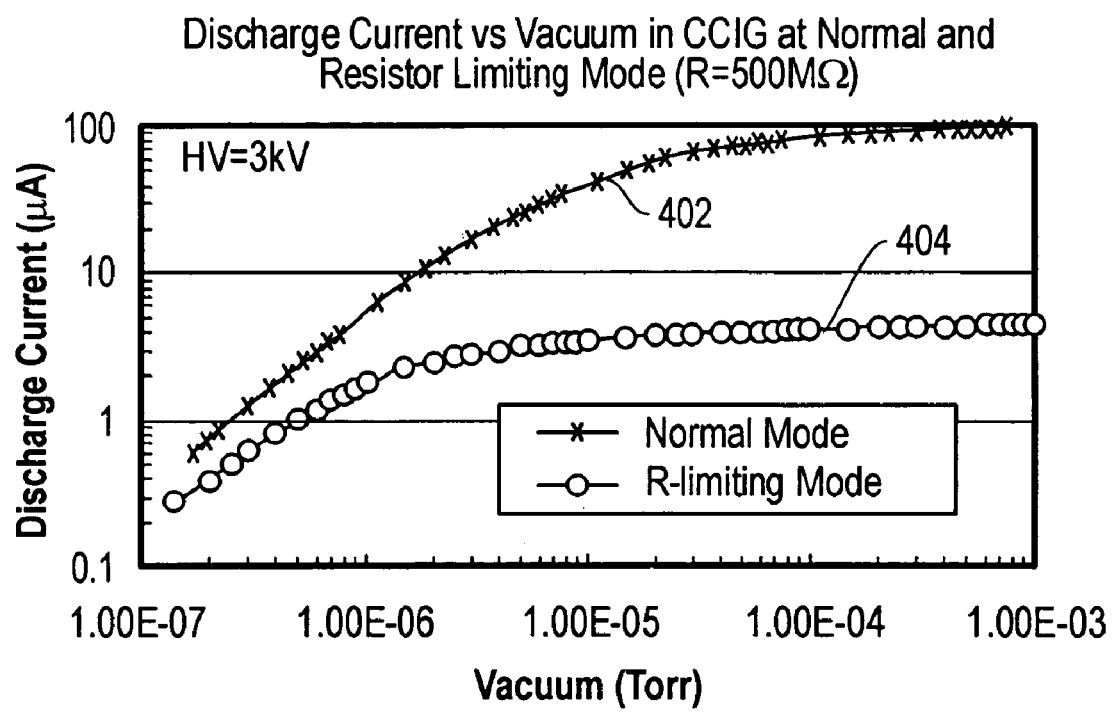
FIG. 4 is a graph showing the discharge current versus vacuum measured in two CCIGs as a function of vacuum, where X's represent current measured in conventional operation and circles represents currents measured with a 500 Megohm resistance in series with the ionization circuit.

For significant charge particle-induced deposition, a high ion current density is necessary. Line 402 of FIG. 4 shows the discharge current measured in a conventional CCIG gauge used in a circuit edit system as a function of vacuum, where "X"s represent results measured in normal operation. FIG. 4 shows that the discharge current increases quickly as the vacuum reduces. At the vacuum pressure of about $1\times10^{-5}$ Torr, at which most circuit edit processes take place, the ionization current approaches 40 μA. With an anode having an area of about 1 cm$^2$, the current density is about 40 μA/cm$^2$, which is sufficiently large to cause a rapid deposition when unfriendly gases are present. Therefore, applicant concluded that large discharge current density in the CCIG in conjunction with unfriendly gases, such as siloxane compounds, metal organic gases, such as tungsten carbonyl, together with oxygen, cause the deposition of $SiO_2$ and $WO_x$ insulating films on CCIG electrodes, and the consequent rapid failure of the CCIG. Other unfriendly gases may promote undesirable etching rather than deposition. Unfriendly gases typically react with the charged particles and form unwanted compounds that deposit insulating material, corrode elements in the vacuum system, or otherwise interfere with the operation of the system.

In the case of the charge particle-induced film deposition, the deposition rate typically depends on the current density at the targets, which in the case of a CCIG, are the anode and the cathode. If the charge current density can be kept small, the insulator deposition rate can be substantially slowed, which can provide a longer lifetime of operation for a CCIG. The charge current density at the CCIG anode/cathode can be decreased by either decreasing the discharge current or by increasing the area of the anode and/or cathode surface.

Decreasing Current Density by Increasing Area of the Anode and/or Cathode

Figure 5B:
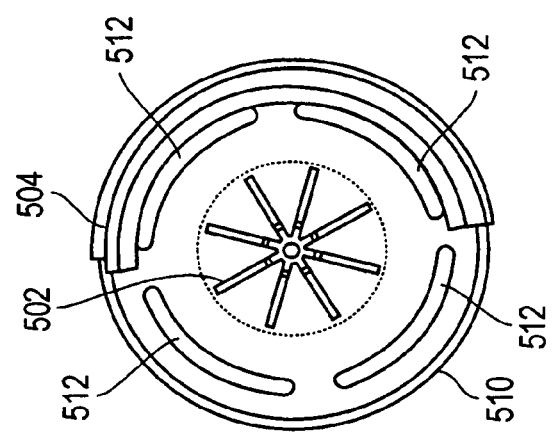
FIGS. 5A and 5B show components of a CCIG in accordance with one embodiment of the invention.
Figure 5A:
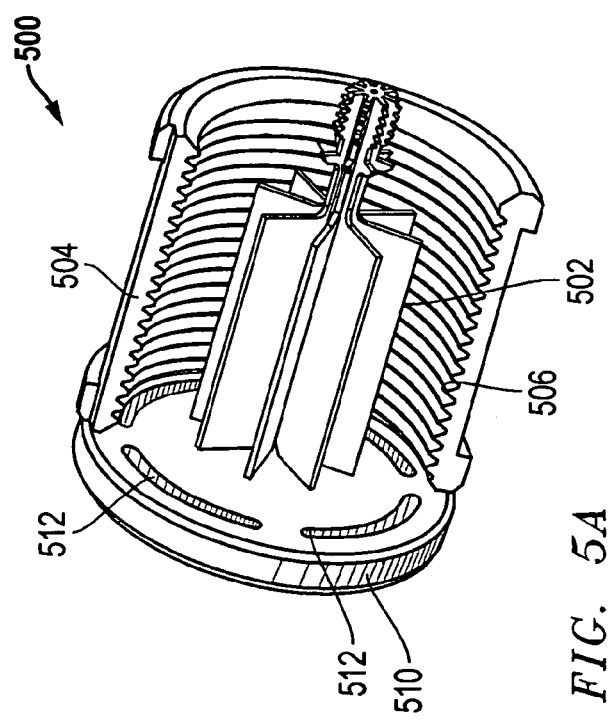
Figure 5C:
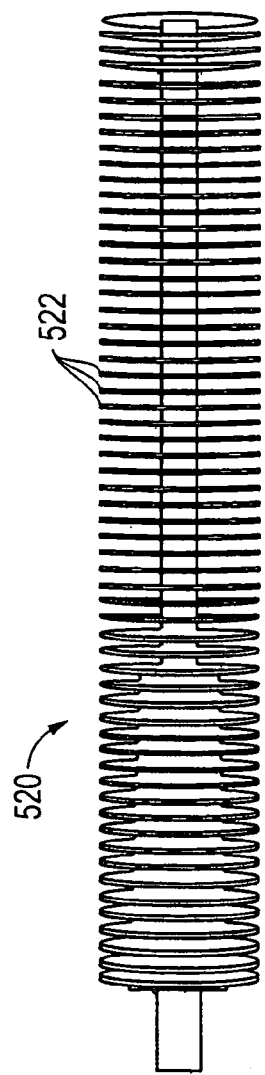
FIG. 5C shows an alternative embodiment of an anode in accordance with the principals of the invention.

Prior art CCIG's typically have an anode surface area of about 1 cm$^2$ and a cathode surface of about 19 cm$^2$. FIGS. 5A, 5B, and 5 illustrate components of an embodiment of the invention having increased electrode surface areas. FIG. 5A is a pictorial drawing showing a CCIG 500 having with star-shaped anode 502 and a cathode 504 having a grooved inside surface 506 and end cap 510. In FIG. 5A, a portion of the cathode 504 cut away to show the anode 502. FIG. 5B shows an end view of the cathode of FIG. 5A, with a portion of the end cap 510 cut away to show the anode 502 and grooved surface 506. The grooves in the cathode surface increase the area of the cathode surface 506 facing the anode 502 at least two fold, and the surface area of the anode is increased dramatically. End cap 510 includes four slots 512 to allow gas to enter the gauge. Various other anode designs that provide a large surface area can also be used. For example, FIG. 5C is a pictorial drawing showing an anode 520 having disk-shaped fins 522 that also provides a large surface.

A preferred anode has a surface area of greater than about 2 cm$^2$, greater than about 5 cm$^2$, greater than about 10 cm$^2$, or greater than about 15 cm$^2$. The anode surface area is preferably between about 10 cm$^2$ and about 23 cm$^2$. A preferred cathode has a surface area of greater than about 20 cm$^2$, greater than about 25 cm$^2$, greater than about 30 cm$^2$ or greater than about 35 cm$^2$, preferably between 20 cm$^2$ and 40 cm$^2$. The gap between the anode and the cathode is preferably greater than 6 mm for achieving high vacuum range measurements. An anode shaped to increase its surface area can be considered to have as its radius the radius of a cylinder that would enclose the anode. In some embodiments, a preferred anode has a surface area that is greater than that of the enclosing cylinder.

Figure 6:
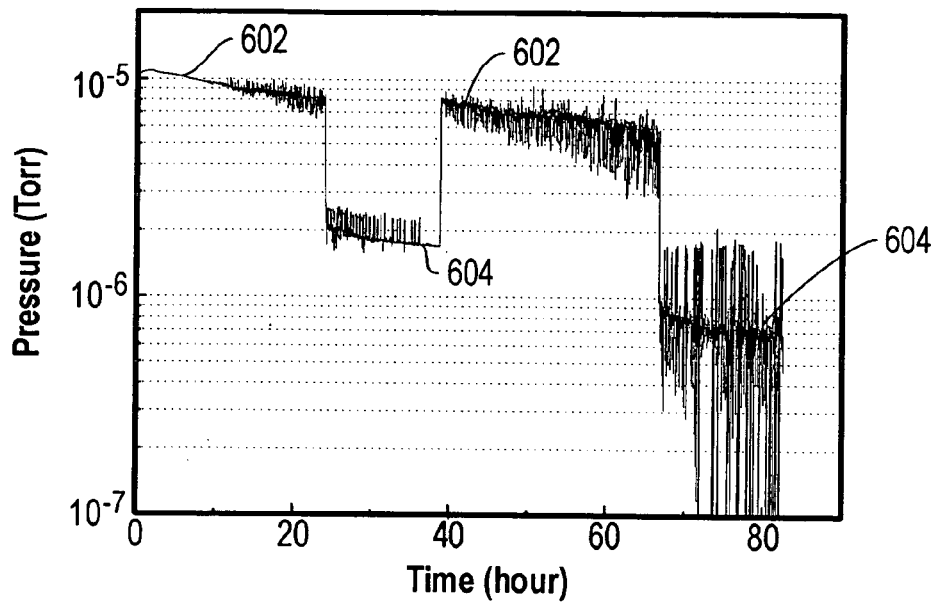
FIG. 6 is a graph showing the output of a prior art CCIG as a function of time of exposure to siloxane and oxygen
Figure 7:
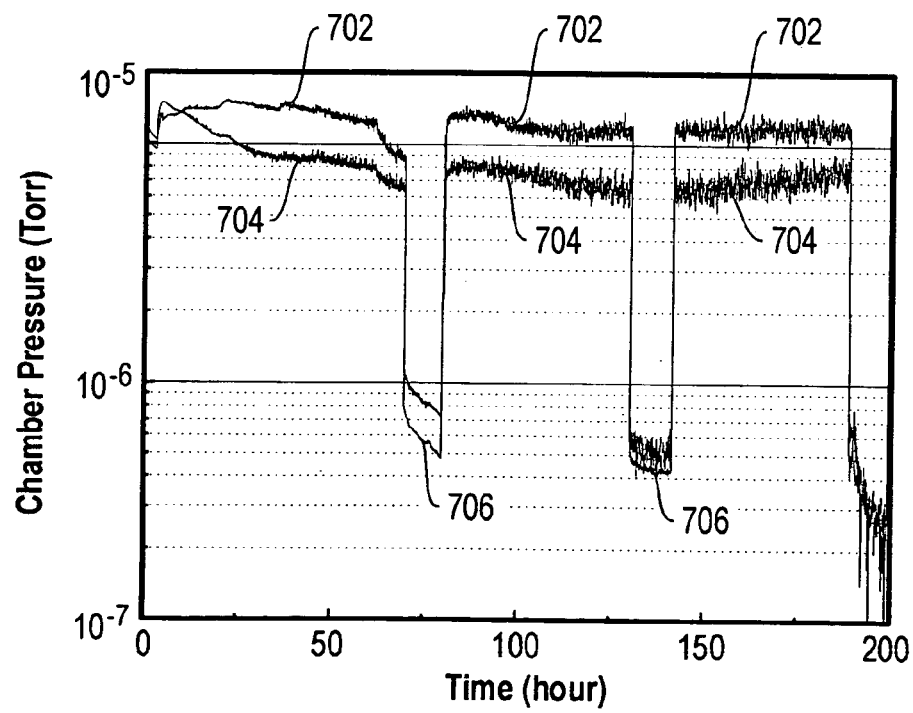
FIG. 7 is a graph showing the output of two CCIG embodiments of the invention as a function of time of exposure to siloxane and oxygen.

FIG. 6 shows pressure reading versus time for a prior art CCIG exposed to an atmosphere of siloxane and oxygen, and FIG. 7 shows a similar graph for an embodiment of the invention. In both graphs, the gas flows intermittently. In FIG. 6, areas labeled 602 indicate pressures at times in gas was flowing into the system and areas labeled 604 indicate pressures at times when the gases were shut off. When flowing, the siloxane and oxygen together produce a combined constant pressure of about 1.2×10$^{-5}$ torr. After about 30 hours, FIG. 6 shows that the gauge pressure reading drops from about 1.2×10$^{-5}$ to an inaccurate reading of about 5×10$^{-6}$ torr to 8×10$^{-6}$ torr, although the actual pressure was held constant at about 1.2×10$^{-5}$ torr while gas was flowing. In addition, the fluctuations in FIG. 6 show that the gauge readings become very unstable. Considering the drop in the pressure reading and the instability, applicant estimates that the useful life of the prior art gauge to be about 30 hours under the conditions described.

FIG. 7 shows pressure reading versus time for two embodiments of the invention. The line labeled 702 shows the pressure readings from an embodiment using a star-shaped anode, similar to the one shown in FIG. 5A, having a surface area of about 20 cm$^2$. Line 704 shows the pressure readings from an embodiment using a disk version anode, similar to the one shown in FIG. 5C, having a surface area of about 23 cm$^2$. In both embodiments, the cathode is made from Titanium and has a large surface area of about 30 cm$^2$. The drop in chamber pressure reading around 75 hours and 130 hours in areas 706 show where the gas stopped flowing into the chamber. Graph 7 shows that after 160 hours of gas exposure, the gauge having the star-shaped anode still reads pressure of about 1×10$^{-5}$ torr. The embodiment using the disk-shaped anode reads a pressure of about 7–8×10$^{-6}$ torr. The readings of both gauges are relatively stable compared to the prior art gauge of FIG. 6. Based on these data it is concluded that embodiments of the invention can provides at least six times the useful life of the conventional CCIG even when unfriendly gases are present.

Figure 8:
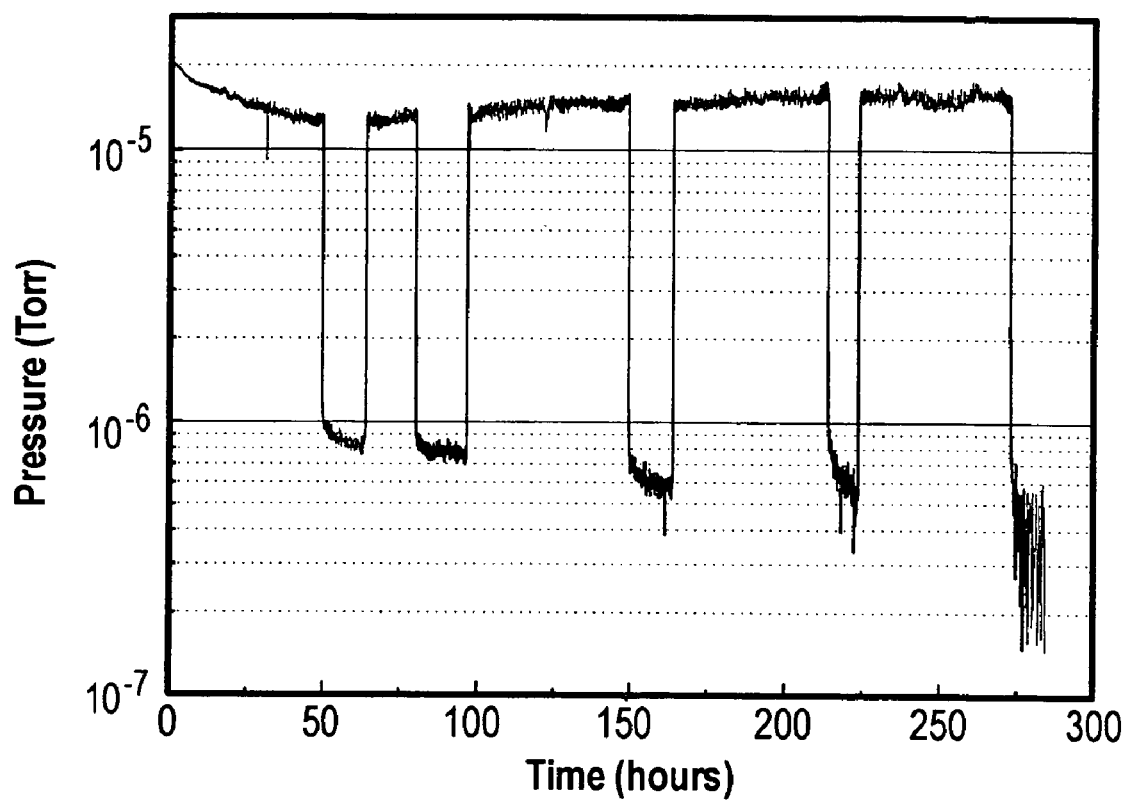
FIG. 8 is a graph showing the output of a CCIG embodiment of the invention as a function of time of exposure to siloxane and oxygen.

FIG. 8 shows the pressure reading versus time measured for another embodiment of a CCIG using a star-shaped anode having an area of about 10 cm$^2$ and a cathode having a surface area of about 19 cm$^2$. The gauge still works quite well after about 240 hours of continuous exposure to the unfriendly gases. The pressure reading not only drops very little, but also stays very stable. This further proves that our solutions is practically feasible and can extend CCIG lifetime a lot even with experiencing unfriendly gases. In this gauge the current density received by electrodes is comparable to that in the gauge discussed in FIG. 7.

Decreasing Current Density by Decreasing Ionization Current

FIG. 4 shows the discharge current as a function of vacuum for two CCIGs. As described above, the X's that define line 402 represent discharge current measurement taken using a conventional CCIG. The circles that define line 404 represent measures taken from an embodiment of the invention in which a 500 MΩ resistor is placed in series with the ionization circuit. As can be seen by comparing the discharge current value at 10$^{-5}$ Torr in line 402 and line 404, the ionization current decreased dramatically, from about 40 μA to about 3 μA, with the 500 MΩ resisters, thereby dropping the current density to about 3 μA/cm$^2$.

Figure 9A:
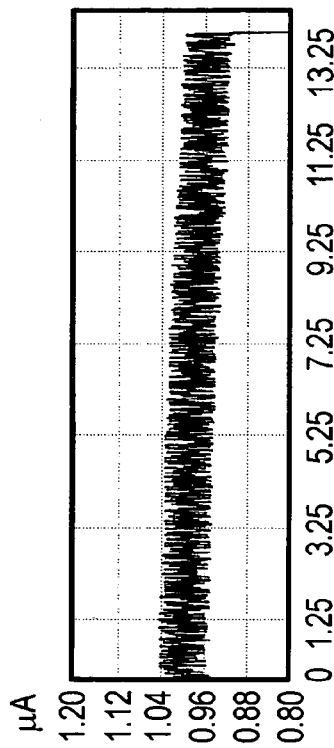
FIGS. 9A and 9B show ionization currents over time with a consecutive expose to siloxane and oxygen, using an anode having an area of about 1 $cm^2$. The CCIG of FIG. 9C using an anode having an area of about 23 $cm^2$. A limiting resistor of 2 GΩ was used in both cases.
Figure 9B:
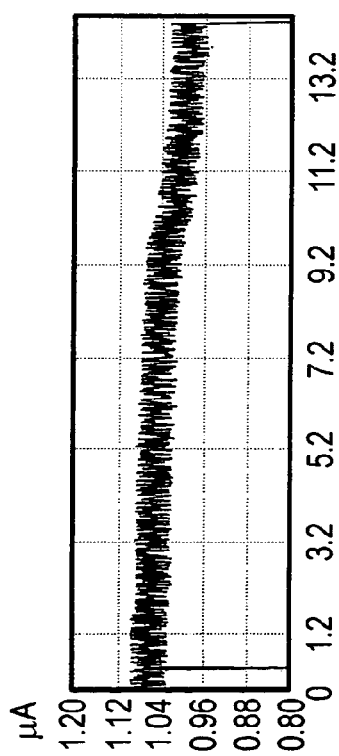
Figure 9C:
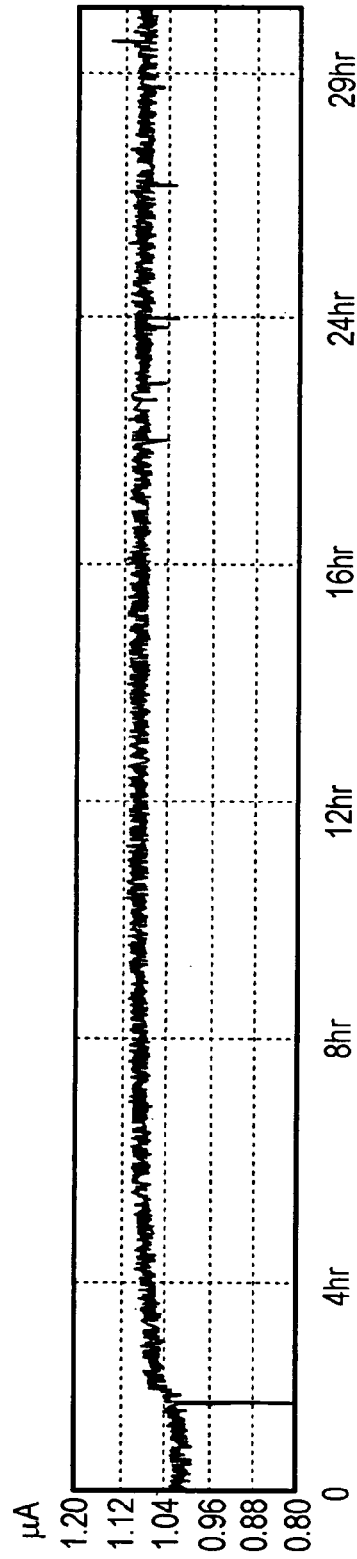

FIGS. 9A–9C shows measurements of the ionization current versus time for a CCIG that includes a 2 GΩ resistor inserted into the ionization circuit to attenuate the discharge current. FIG. 9B is a continuation of the measurement begun in FIG. 9A. FIGS. 9A and 9B shows that after about 28 hours of operation, the gauge still provides reasonable vacuum reading, although the discharge current decreased somewhat from 1.06 μA to 0.96 μA. FIG. 9C shows a graph the ionization current versus time for an embodiment that includes an anode having a useful surface area of 23 cm$^2$ as well as including 2 GΩ resistor inserted into the ionization circuit. FIG. 9C shows that the current, after an initial period, remained essentially constant after 30 hours of operation. FIG. 9A-9C shows that reducing the discharge current extends the life of a CCIG.

The gauges that produced the measurements in FIGS. 4 and 9 were operating in a constant voltage mode, that is, a constant high voltage, typically between about 2 kV and about 6 kV, was applied between the anode and cathode. In a constant voltage mode of operation, as the resistance changes, either because the gas pressure changes or because an insulating layer is deposited on the electrodes, the current in the circuit changes. In some embodiments of the invention, a constant current mode is used. In this mode, the CCIG is operated at a low and constant ionization current. An electronic feedback circuit adjusts the high voltage between the anode and cathode to maintain a constant current, and the vacuum is calibrated against the voltage value, as opposed to being calibrated against the current value in a constant voltage mode.

Figure 10:
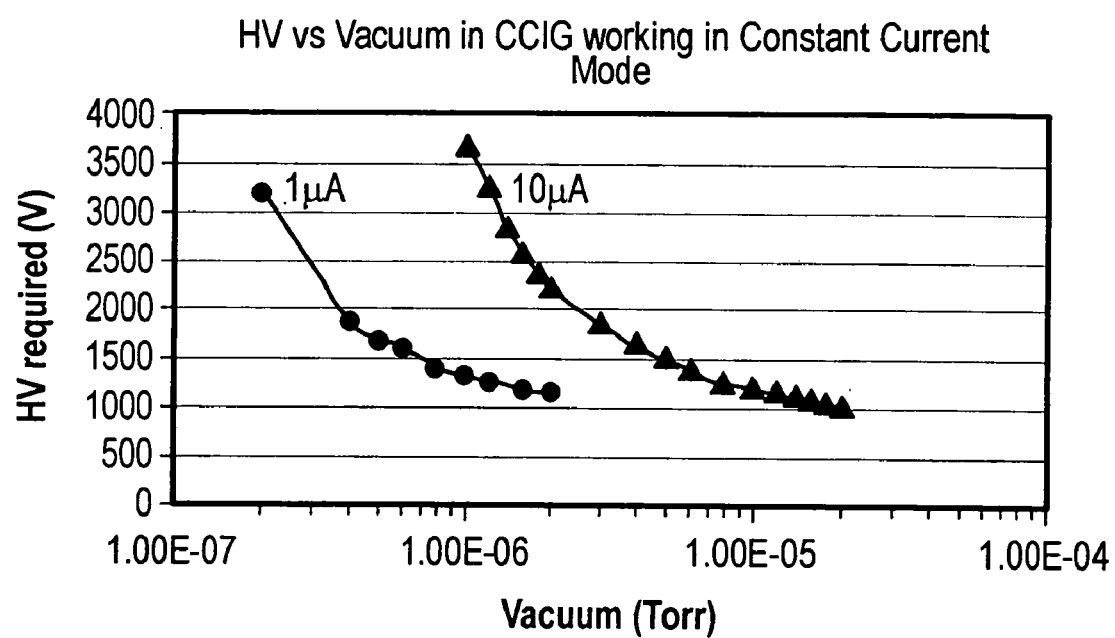
FIG. 10 is a graph showing the voltage required versus vacuum for operating a CCIG in a constant current mode at 1 μA and at 10 μA.

FIG. 10 shows the voltage required at various pressures to maintain a constant current. For a vacuum from about $2 \times 10^{-7}$ to about $2' 10^{-6}$ Torr, a constant current of about 1 µA is used, and for vacuum from about $1 \times 10^{-6}$ to about $2 \times 10^{-5}$ Torr a constant current of about 10 µA is used. The voltage required to maintain such ionization currents changes monotonically from about 1 kV to about 4 kV as sweeping vacuum from low to high. Two constant currents are used in different vacuum ranges to maintain the required high voltage in a realistic range. The low ionization current is expected to considerably extend the useful life if the gauge, particularly when combined with a large area, carbon coated anode and a titanium cathode.

Novel Use of Materials

The novel use of construction materials can also extend the useful life of CCIGs. Backscattered electrons and secondary electron emission from the electrodes contribute to the charge current density, and therefore the deposition. By using materials that reduce the emission of secondary or backscattered electrons, the charge current density can be reduced.

Conventional CCIG electrodes are typically made of stainless steel, which produces a large secondary emission and back scattering. Some embodiments of the invention use electrode materials that produce fewer backscattered electrons and secondary electrons, or have other desirable properties For example, some embodiments construct anode from carbon or coat a metallic anode with carbon. The relatively low atomic mass of carbon produces relatively fewer backscattered electrons. Carbon also produces fewer secondary electrons. In addition, carbon coating or carbon electrode helps to remove oxygen by forming volatile $CO_2$. This mechanism can prevent deposition or reduce the formation of oxide insulators onto electrode, thereby extending gauge life. Furthermore, the gauge can be easily refurbished by removing a layer of carbon.

Use of novel materials for the cathode can also improve gauge life expectancy. During operation, the cathode is heavily bombarded by gas ions having kinetic energies of a few thousand electron volts. As described above, deposition of insulator films on the cathode takes place in the presence of unfriendly gases like siloxane and oxygen. One method to prevent the build-up of an insulating film is by using "gettering" to remove unfriendly gas from the gauge environment and to renew the cathode surface. The principal of gettering is well known and used, for example, in a type of vacuum pumps referred to as "ion pumps."

In gettering, ions sputter material from a surface and the material redeposits elsewhere on the surface and buries contamination. The use of gettering on the cathode would continually refresh the surface and remove unfriendly gases from the gauge. A suitable material for the cathode to facilitate gettering in the vacuum range where the CCIG operates, that is, about $10^{-5}$ Torr, is titanium. Since titanium atoms can be sputtered easily and redeposited to the nearby sites. Gas molecules absorbed on its surface can be buried by titanium atoms, and the cathode surface can be kept fresh and conducting, instead of becoming insulating. Other materials that facilitate getting, such as tantalum, could also be used.

The present invention can improve CCIG lifetime and performance in any vacuum system where there exist unfriendly gases. Although a theoretical basis for the success of the invention is described above, the invention has been shown to work, regardless of the accuracy of the theory.

The present invention includes several aspects that are thought to be novel. Not all aspects need to be included with every embodiment of the invention. For different applications, different aspects may be employed, separately or together, and still be within the scope of the invention. For example, one could operate an anode or cathode with increased area or made from preferred materials operate in either a constant voltage mode or a constant current mode. Several types of CCIGs are known, such as the Penning, the magnetron, the inverted magnetron and the double inverted magnetron, and the principles of the invention can be applied to any of the gauges.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A cold cathode ion gauge for measuring pressure in a vacuum, comprising:
   an anode having a surface area;
   an unheated cathode; and
   a power source for applying a voltage between the anode and cathode to produce a discharge current, the power supply and the surface area of the anode being configured such that the average discharge current density at the anode is less than 20 µA/cm² operating in, and measuring with an accuracy of at least 15 percent, a pressure of $1 \times 10^{-5}$ torr.

2. The, ion gauge of claim 1 in which the power supply and the surface area of the anode are configured such that the average current density of the discharge current at the anode is less than about 10 µA/cm² when operating in and measuring with an accuracy of at least 15 percent a pressure of $1 \times 10^{-5}$ torr.

3. The ion gauge of claim 1 in which the power supply and the surface area of the anode are configured such that the average current density of the discharge current at the anode is less than about 5 µA/cm² when operating in and measuring with an accuracy of at least 15 percent a pressure of $1 \times 10^{-5}$ torr.

4. The ion gauge of claim 1 in which the power supply and the surface area of the anode are configured such that the average current density of to discharge current at the anode is less than about 1 µA/cm² when operating in and measuring with an accuracy of at least 15 percent a pressure of $1\times10^{-5}$ torr.

5. The ion gauge of claim 1 in which the cathode comprises a getter material.

6. The ion gauge of claim 5 in which the cathode comprises titanium, tantalum, barium, zirconium or thorium.

7. The ion gauge of claim 1 in which a substantial portion of the surface area of the anode comprises carbon or other materials that produce backscattered and secondary electrons with a yield lower than or comparable to carbon as a function of ionization beam energy.

8. The ion gauge of claim 1 in which the power supply limits the discharge current to less than 40 µA when operating in and measuring with an accuracy of at least 15 percent a pressure of $1\times10^{-5}$ torr.

9. The ion gauge of claim 1 in which the power supply supplies a substantially constant current.

10. The ion gauge of claim 1 in which the power supply includes a limiting resistor in series with a discharge current between the anode and cathode, the limiting resistor having a resistance of greater than 100 Megohm.

11. The ion gauge of claim 1 in which the surface area of the anode is greater than that of a smooth cylinder having the same diameter.

12. The ion gauge of claim 11 in which the anode includes one or more surfaces extending radially from its longitudinal axis.

13. The ion gauge of claim 12 in which the one or more surfaces lie in a plane that is perpendicular to the longitudinal axis.

14. The ion gauge of claim 12 in which the surfaces lie in a plane that includes the longitudinal axis.

15. A cold cathode ion gauge for measuring pressure in a vacuum, comprising:
an anode having a surface area greater than two square centimeters;
a non-thermionic cathode;
a power source for applying a voltage between the anode and cathode, and
a source of a magnetic field between the anode and the cathode, the magnetic field having a component perpendicular to the electric field between the anode and the cathode,
wherein the movement of charged particles to the anode and cathode defines a discharge current, the average discharge current density at the anode being less than 20 µA/cm² when operating in and measuring with an accuracy of at least 15 percent a pressure of $1\times10^{-5}$ torr.

16. The ion gauge of claim 15 in which the anode has a surface area greater than 5 square centimeters.

17. The ion gauge of claim 15 in which the anode has a surface area greater than 10 square centimeters.

18. The ion gauge of claim 15 in which the anode has a surface area greater than 15 square centimeters.

19. The ion gauge of claim 15 in which the cathode comprises titanium.

20. The ion gauge of claim 15 in which the anode comprises carbon.

21. The ion gauge of claim 15 in which the power supply limits the discharge current to less than 40 µA at $10^{-5}$ torr.

22. The ion gauge of claim 21 in which the power supply supplies a substantially constant current.

23. The ion gauge of claim 21 in which the power supply includes a limiting resistor in series with the discharge current, the limiting resistor having a resistance of greater than 100 Megohm.

24. A cold cathode ion gauge for measuring pressure in a vacuum, comprising:
an anode having a diameter and having a surface area, the surface area being greater than the surface area of a cylinder having the same diameter as the anode;
an unheated cathode, the cathode partially surrounding the anode;
a power source for applying a voltage between the anode and cathode, and
a current meter for measuring ionization current to provide an indication of the vacuum pressure,
wherein the movement of charged particles to the anode and cathode defines an ionization current, the ionization current density for the surface of the anode when the voltage is applied being less than the ionization current density that would be produced by a second anode with a surface area equal to a cylinder having the same diameter as the said anode.

25. An ion gauge for measuring pressure in a vacuum, comprising:
an anode having a anode surface for receiving electrons, a substantial portion of the anode surface composed substantially of carbon or other materials that produce backscattered and secondary electrons with a yield lower than or comparable to carbon as a function of ionization beam energy;
a non-thermionic cathode;
a power source for applying a voltage between the anode and cathode, and
a current meter for measuring ionization current to provide an indication of the pressure,
wherein the movement of charged particles to the anode and cathode defines an ionization current, the ionization current density for the surface of the anode when the voltage is applied being less than the ionization current density that would be produced by a second anode with a surface area equal to a cylinder having the same diameter as the said anode.

26. The vacuum gauge of claim 25 in which the anode is composed of a metallic material coated at least in part with carbon.

27. The vacuum gauge of claim 25 in which the cathode has surface for receiving ions, the, cathode surface comprising a getter material.

28. The vacuum gauge of claim 27 in which the cathode surface comprises titanium, tantalum, barium, zirconium thorium or other getter materials.

29. An ion gauge for measuring pressure in a vacuum, comprising:
an anode having a surface area;
a cathode; and
a power source for applying a voltage between the anode and cathode to produce a discharge current, the anode having a surface area such that the average discharge current density is sufficiently low such that the discharge current drops by less than ten percent after operating in a vacuum at a pressure of $1\times10^{-5}$ torr in the presence of siloxane and oxygen for a period of 150 hours.

30. The ion gauge of claim 29 in which the anode has a surface area such that the average discharge current density is sufficiently low such that the discharge current drops by less than ten percent after operating in a vacuum at a pressure off 1×10⁻⁵ torr in the presence of siloxane and oxygen for a period of 150 hours.

31. The ion gauge of claim 29 in which the anode has a surface area that is greater than that of a cylinder of the same radius.

32. A vacuum system including a cold cathode ion gauge suitable for measuring vacuums having a pressure of less than $10^{-4}$ Torr, comprising:
   an unheated cathode positioned in a vacuum chamber having a pressure of less than about $10^{-4}$ Torr;
   an anode positioned in a vacuum chamber;
   a power source for providing an electrical potential difference voltage between the cathode and the anode, the power source limiting the discharge current less than 50 μA at a pressure of $10^{-5}$ Torr,
   a magnetic field source for a magnetic, field in a portion of the space between the cathode and the anode.

33. The vacuum system of claim 32 in which the power source adjusts the voltage to provide a substantially constant current.

34. The vacuum system of claim 33 in which the power source operates at a more than one substantially constant current level, the substantially constant current level being dependent upon the vacuum in the vacuum system.

35. The vacuum system of claim 32 in which the power source limits the current to less than about 10 μA at $10^{-5}$ Torr.

36. The vacuum system of claim 32 in which the power source limits the current to less than about 1 μA at $10^{-5}$ Torr.

37. The vacuum system of claim 32 in which the power source includes a limiting resistance in series with the discharge current, the limiting resistor having a resistance greater than about 50 Megohm.

38. The Vacuum system of claim 32 in which the power source includes a limiting resistance in series with the discharge current, the limiting resistor having a resistance greater than about 500 Megohm.

39. The vacuum system of claim 32 in which the power source includes a limiting resistance in series with the discharge current, the limiting resistor having a resistance greater than about 1 Gigohm.

40. The vacuum system of claim 19 in which reducing the deposition of insulating material is by fabricating the anode from carbon.

41. The vacuum system of claim 19 in which reducing the deposition of insulating material is by fabricating the cathode from titanium.

42. The vacuum system of claim 19 in which the vacuum gauge is cold cathode ion gauge.

* * * * *